(12) United States Patent
Onodera et al.

(10) Patent No.: US 6,327,932 B1
(45) Date of Patent: *Dec. 11, 2001

(54) STEERING APPARATUS

(75) Inventors: Mikio Onodera; Hidetaka Numata; Katsuya Mitsuzuka, all of Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,727

(22) Filed: May 21, 1999

(30) Foreign Application Priority Data

May 22, 1998 (JP) .................................. 10-141552

(51) Int. Cl.[7] ........................................ B62D 1/04
(52) U.S. Cl. ................................................ 74/552
(58) Field of Search .............................. 74/552; 307/10.1

(56) References Cited

U.S. PATENT DOCUMENTS

| | | | | |
|---|---|---|---|---|
| 3,698,713 | * | 10/1972 | Jimerson | 273/86 E |
| 3,892,988 | * | 7/1975 | Gran | 310/50 |
| 4,485,371 | * | 11/1984 | Yamada et al. | 74/552 |
| 4,578,592 | * | 3/1986 | Nakazawa et al. | 74/552 |
| 4,605,380 | * | 8/1986 | Camm et al. | 446/14 |
| 4,638,131 | | 1/1987 | Kidd et al. | 200/61.55 |
| 5,203,563 | * | 4/1993 | Loper, III | 273/148 B |
| 5,520,066 | * | 5/1996 | Tueri | 74/552 |
| 5,615,380 | * | 3/1997 | Hyatt | 395/800 |
| 5,855,144 | * | 1/1999 | Parada | 74/552 |
| 5,857,986 | * | 1/1999 | Moriyasu | 601/49 |
| 5,959,613 | * | 9/1999 | Rosenberg et al. | 345/161 |
| 6,119,291 | * | 9/2000 | Osborne et al. | 5/600 |

FOREIGN PATENT DOCUMENTS

| | | |
|---|---|---|
| 40 29 657 A1 | 3/1992 | (DE) . |
| 44 23 744 A1 | 4/1995 | (DE) . |
| 0 762 141 A2 | 3/1997 | (EP) . |
| 0 796 756 A2 | 9/1997 | (EP) . |

* cited by examiner

*Primary Examiner*—David A. Bucci
*Assistant Examiner*—Chong H. Kim
(74) *Attorney, Agent, or Firm*—Brinks Hofer Gilson & Lione

(57) ABSTRACT

A steering apparatus capable of accurately recognizing operations of an operation section and of reducing the number of parts and simplifying its structure. The steering apparatus is composed of a steering wheel for controlling movements, operation sections mounted on the steering wheel for operating equipment, and a vibration section for giving vibrations to at least a portion of the steering wheel in relation to the operations of said operation sections.

14 Claims, 4 Drawing Sheets

STEERING APPARATUS

BACKGROUND OF THE INVENTION

1. Field of the Invention

The present invention relates to a steering apparatus to be mounted on a motor vehicle, and more particularly to a steering apparatus in which an operating section (for example, switches) for operating other equipment (for example, vehicle mounted equipment) are installed on a steering wheel so that the other equipment are operable while the steering wheel is operated.

2. Description of the Related Art

Presently, switches for operating vehicle mounted equipment (for example, a car audio system, a car airconditioner and others) have been installed as additional components on a steering wheel of a motor vehicle. While a conventional steering apparatus has been made such that a tactile response to the on/off of a switch has not developed and the confirmation on the on/off operation of the switch has been made by viewing a monitor display unit or the like placed nearby. However, it is difficult to confirm the on/off operation while viewing the monitor display unit while the vehicle is being driven, and it is even troublesome in the driving operation.

In order to eliminate these drawbacks, there has been proposed a structure shown in FIGS. 5 and 6. As FIG. 5 shows, retractable projections 102 are provided in close proximity to each other on a circumferential surface of a grip section 101 of a joy stick 100, with four projections 102 being arranged vertically while four projections 102 being arranged horizontally, sixteen in total.

As FIG. 6 shows, the positions of the projections 102 correspond respectively to portions designated at numeral 104 when the driver grips the grip section 101 with his hand 103, that is, to the finger tips and the intermediate portions of the first to fourth fingers of the hand 103 and the portions of the palm close to the bases of the fingers. Although not illustrated, inside each of the projections 102, a vibration means is provided with a piezoelectric device whereby the projection 102 individually undergoes vibration control.

When the grip section 101 is held with the hand 103 so that the joy stick 100 is inclined in a desired direction, not only is the operation of vehicle mounted equipment made through a generated output signal accompanying that operation but also the aforesaid vibration means is driven on the basis of the same output signal to transmit vibration to the projection 102. The hand 103 can sense the vibrating projection 102 through a tactile impression and, therefore, the driver can confirm the vehicle mounted equipment, currently in operation, through the hand 103.

In this manner, since the operation of vehicle mounted equipment is confirmable through the tactile sense of the hand 103, the need for viewing the monitor display unit, maybe advantageously eliminated. However, even in this instance, some drawbacks still exist.

That is, this joy stick 100 requires a large number of projections 102, vibration means corresponding to each of the projections 102, control means for drive-controlling a large number of vibration means individually, which leads to an increase in the number of parts, a complication in its structure, an increase in its size, a rise in its manufacturing cost, and a problem of assembling work.

In addition, since an individual difference exists in the size of the hand 103 which is to operate the joy stick 100, that is, in the positions signified at the reference numerals 104, a difference may occur in sensing the vibrating projection 102 in the tactile way, which makes it difficult to accurately confirm the operation of the vehicle mounted equipment.

SUMMARY OF THE INVENTION

Accordingly, the present invention has been developed in order to eliminate such drawbacks inherent in the conventional technique, and it is an object of this invention to provide a steering apparatus which is capable of accurately recognizing an operation by an operation section, coupled with reducing the number of parts, simplifying its construction, reducing its size and manufacturing cost and simplifying its assembly work.

This object is achievable by a first means comprising a steering wheel for controlling movements (for example, forward and backward directions, and other directions), an operation section (for example, switches) installed on the steering wheel for operating other equipment (for example, vehicle mounted equipment, and a vibration means (for example, a vibration system including a solenoid) for giving vibrations to at least a portion of the steering wheel in accordance with the operation of the operation section.

Furthermore, the aforesaid object is achievable in a manner that, in the aforesaid first means, a second means is constructed to give vibrations in different modes to the steering wheel in accordance with the contents of the operation of the operation section (for example, volume control in a car audio system, and air quantity control in a car air conditioner).

Still further, the aforesaid object is achievable by the aforesaid first or second means involving a third means in which the steering wheel is a steering wheel in a motor vehicle and the other equipment is equipment mounted on the motor vehicle.

Still further, the aforesaid object is achievable by the first means involving a fourth means in which the vibration means is incorporated into the steering wheel.

Still further, the aforesaid object is achievable by the aforesaid first or fourth means involving a fifth means whereby vibrations generated from the vibration means are transmitted through an elastic member (for example, rubber and others) to a surface of the steering wheel.

For achieving the aforesaid object, the aforesaid first or fourth means involves a sixth means in which a vibration transmission cover is provided on a surface of the steering wheel.

For achieving the aforesaid object, the aforesaid first or second means includes a seventh means in which a plurality of equipment are operated by the aforesaid operation section and the equipment to be operated is selectable through a selection means.

For achieving the aforesaid object, the aforesaid first, second or seventh means is based upon an eighth means in which a plurality of operation sections are installed on the steering wheel and each of vibrations different in mode is given to the steering wheel in relation to each of the operation sections.

As described above, in this invention, a vibration means is provided to give to the steering wheel vibration corresponding to the operation of the operation section, so that a tactile response returns to the palm of the driver at the manipulation of the operation section. Additionally, since the positions receiving the vibrations are not the fingertips or the intermediate portions of the fingers, the response can accurately be made irrespective of the size of the hand. Thus, it is possible to recognize the operation by the operation section precisely.

Moreover, at least one vibration means will do, which enables further reduction of the number of parts, further simplification of its structure, further reduction of manufacturing cost and further simplification of assembling work as compared with the techniques proposed so far.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 1:
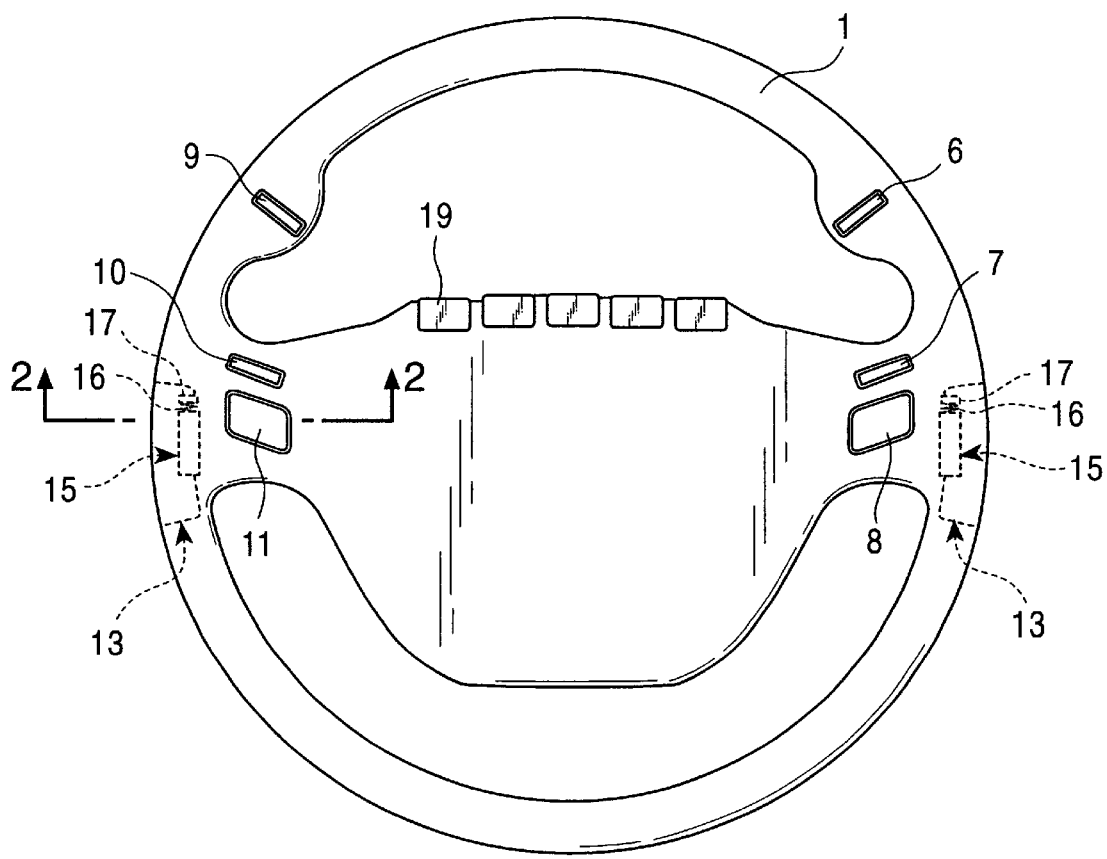
FIG. 1 is a top view showing a steering apparatus according to an embodiment of this invention.

Referring to the drawings, a description will be made hereinbelow of an embodiment of the present invention. FIG. 1 is a top view showing a steering apparatus according to an embodiment of this invention, FIG. 2 is an enlarged cross-sectional view taken along a line 2—2 of FIG. 1, FIG. 3 is a block diagram showing a control section including the steering apparatus, and FIG. 4 is an illustration of pulse waveforms to be supplied to a vibration means of the steering apparatus.

A generally circular steering wheel 1 is composed of a steering core 2, a pad 3, a body of equipment 4, a body cover 5 (see FIG. 2) and others, and is connected rotatably through a steering wheel shaft (not shown) to a vehicle body.

As FIG. 1 shows, on an upper surface of the steering wheel 1, in the vicinity of a central portion of a right-hand outer circumferential section of the steering wheel 1 there are placed first to third switches 6 to 8, while in the vicinity of a central portion of a left-hand outer circumferential section thereof there are disposed fourth to sixth switches 9 to 11. Since the frequency that the driver puts his hands on the vicinity of the central portions of the right- and left-hand outer circumferential sections of the steering wheel 1 is high, if the various switches 6 to 11 are disposed near these places, to manipulate the switches 6 to 11, there is conveniently no need to shift his hands.

Figure 2:
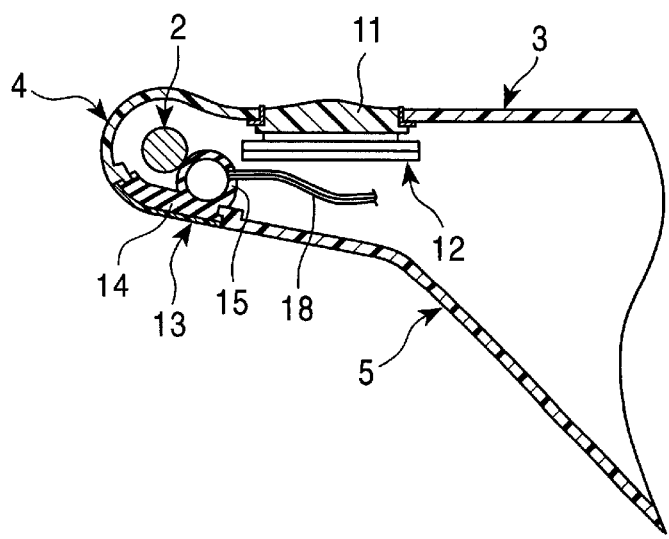
FIG. 2 is an enlarged cross-sectional view taken along a line 2—2 of FIG. 1.
Figure 3:
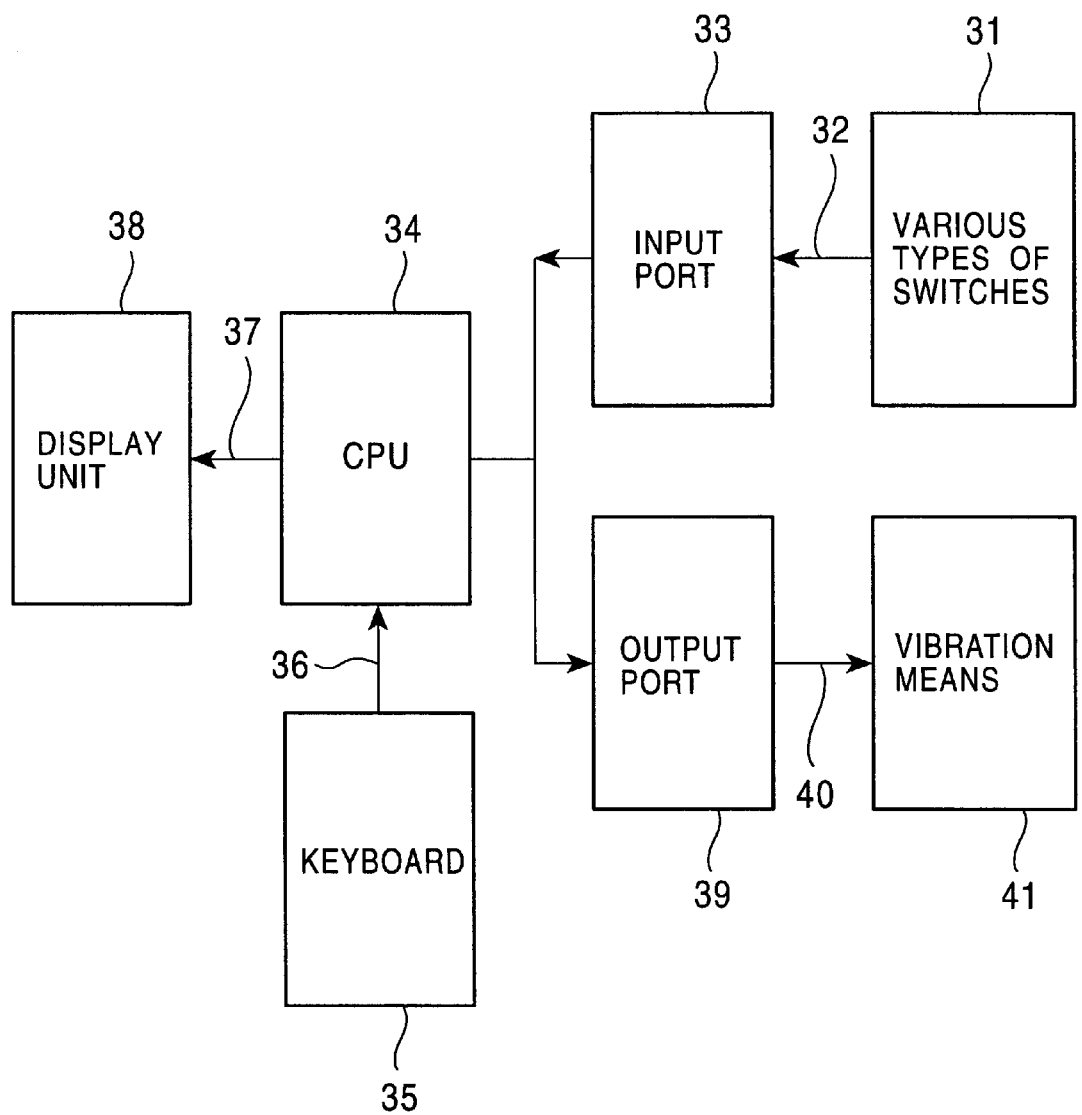
FIG. 3 is a block diagram showing a control section including the steering apparatus.
Figure 4A:
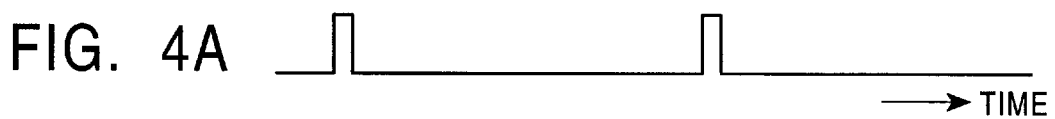
FIG. 4 is an illustration of pulse waveforms to be supplied to a vibration means of the steering apparatus.
Figure 4B:
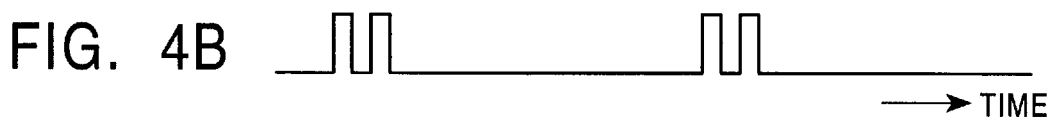
Figure 4C:
Figure 4D:
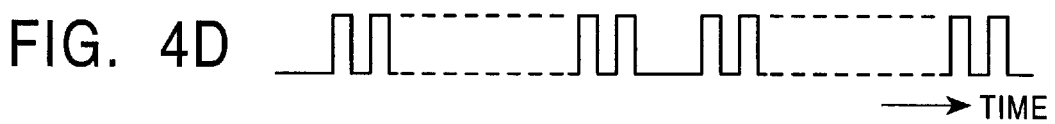
Figure 4E:
Figure 4F:
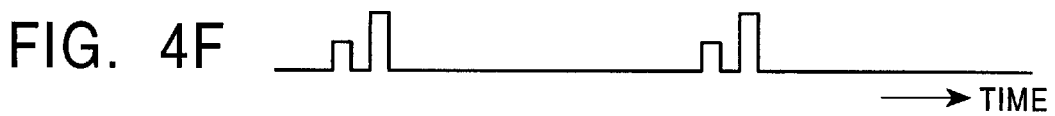
Figure 4G:
Figure 4H:
Figure 4I:
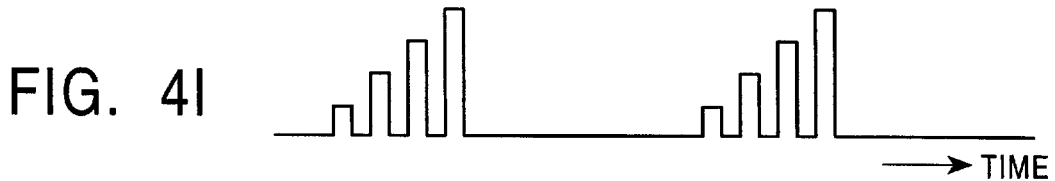
Figure 4J:
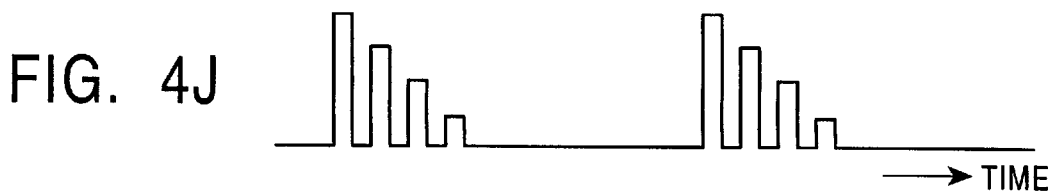
Figure 5:
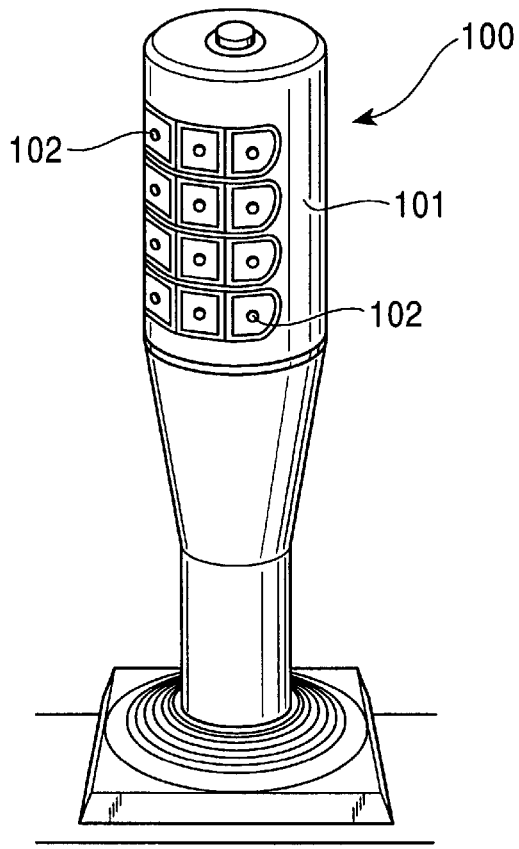
FIG. 5 is a perspective view showing an signal inputting unit proposed so far.
Figure 6:
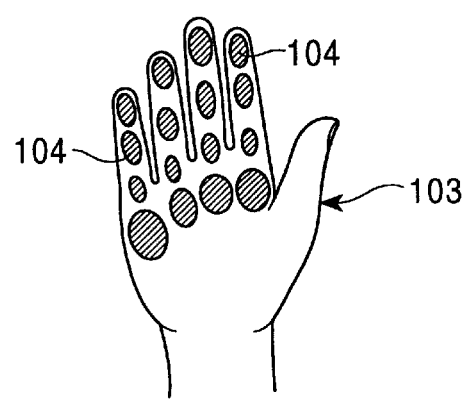
FIG. 6 is a plan view showing a hand which operates the signal input unit.

The first switch 6, the second switch 7, the fourth switch 9 and the fifth switch 10 are made using a rotary push switch, while the third switch 8 and the sixth switch 11 is constructed using a push switch, with each of the switches 6 to 11 being coupled to a wiring board 12 as shown in FIG. 2.

In this instance, the right-hand first to third switches 6 to 8 constitute a group of switches for operating a car audio system, and the first switch 6 takes charge of control of the volume, the second switch 7 is for controlling the tuning, the third switch 8 is for performing the ON/OFF of a power supply. On the other hand, the left-hand fourth to sixth switches organizes a group of switches for operating a car air conditioner, and the fourth switch 9 controls the increase/decrease in air quantity, the fifth switch 10 controls the increase/decrease in temperature set for the interior of the motor vehicle and the sixth switch 11 selects a rec. fresh (circulation of air in the interior of a car or introduction of air from the exterior of the car).

In this instance, although the description is made of the operations of the car audio system and the air conditioner, it is possible to operate other vehicle mounted equipment such as a navigation system and a power window system, and the object to be operated can properly be selected through a mode switch 19 (see FIG. 2) installed additionally on the steering wheel 1.

In the case that vibrations are transmitted to the body of the steering wheel 1, since the body has a large volume and is heavy. If the vibrations are transmitted directly thereto, the vibrations tend to become weak. On the other hand, if the vibrations are transmitted to a vibration transmission cover which is of a relatively small volume and is relatively light, strong vibrations can be given to the driver gripping the vicinity of the vibration transmission cover by his hands. Thus, a vibration transmission cover 13, made from a plastic sheet, is placed on a lower surface in the vicinity of central portions of right- and left-hand outer circumferential section of the steering wheel 1, and as shown in FIG. 2 a solenoid 15, serving as a vibration source, is disposed through an elastic member 14, such as a rubber, a cellular resin and a cloth on the inside of the vibration transmission cover 13. As shown in FIG. 1, a vibrator 17 is placed through a coil spring 16 on a tip portion of the solenoid 15. The vibrations from the vibrator 17 driven by the solenoid 15 are transmitted through the elastic member 14 to the vibration transmission cover 13 so that the driver can sense the vibrations in a tactile way.

If the vibrations are transmitted through the elastic member 14 like this embodiment, soft and comfortable vibrations can be given to the hands. In addition, the installation of the vibration transmission cover 13 allows the vibrations to be transmitted through a relatively large area to the driver. In FIG. 2, reference numeral 18 represents a lead wire connected to the solenoid 15.

FIG. 3 is an illustration of one example of control section. As shown in this illustration, each of switch signals 32 from various types of switches 31 (that is, the first to sixth switches 6 to 11, the mode switch 19, and others) is inputted through an input port 33 to a CPU (Central Processing Unit) 34. Further, the CPU 34 also receives a signal 36 from a keyboard switch 35 installed additionally on a monitor display unit or the like. Based on of the inputted signal 36 and the switch signal 36, the CPU 34 outputs a display signal 37 to a monitor display unit 38 based upon a display so that an operating state of a vehicle mounted equipment or the like appears thereon.

A vibration signal 40 from the CPU 34 is inputted through an output port 39 to a vibration means 41 (composed of the solenoid 15, the vibrator 17, and others) which in turn, is driven in a particular vibration mode in accordance with the contents of the vibration signal 40.

FIG. 4 is an illustration of examples of pulse waveforms to be supplied to the solenoid 15 acting as a vibration source of the vibration means 41. In this illustration, character A indicates that one pulse energization is made periodically to the solenoid 15 so that one vibration is given to the driver gripping the steering wheel 1 by his palm. Further, character B indicates that two-pulses energization is made periodically so that two vibrations are given periodically thereto, while character C indicates that three vibrations are given thereto. In this way, the number of vibrations can be increased gradually. Still further, character D indicates that a large number of pulse currents are supplied for a constant period of time so that vibrations continue during this time period.

Although in the case indicated by the characters A to D the strength (amplitude of the vibrations) is constant, in the case indicated characters E to J, the strength (amplitude) of vibrations is made to vary. That is, the character E shows that two-pulse energization is made to give strong and weak vibrations periodically, and the character F shows that, conversely, two-pulse energization is made to give weak and strong vibrations periodically. Further, the character G shows that three-pulse energization is made to give strong, weak and strong vibrations periodically, while the character H shows that, on the contrary, three-pulse energization is made to give weak, strong and weak vibrations periodically. Moreover, character I shows that the vibration varies to be strengthened gradually, while character J shows that the vibration varies to be weakened gradually. Such various types of, i.e., different, vibration modes are set in advance, and the selection of the vibration modes is made by the CPU 34.

These vibration modes are set individually in corresponding relation to the aforesaid first to sixth switches 6 to 11. For instance, in the case that the volume is turned up with the first switch 6, in the case that the air quantity is increased with the fourth switch 9 and in the case that the setting temperature for the vehicle interior is raised with the fifth switch 10, the vibration mode indicated by the character I in FIG. 4 is set where the vibration becomes stronger gradually. On the other hand, in the case that the volume is turned down with the first switch 6, in the case that the air quantity is decreased with the fourth switch 9, and in the case that the setting temperature for the vehicle interior is lowered with the fifth switch 10, the vibration mode indicated by the character J in FIG. 4 is set where the vibration becomes weaker gradually. Besides, even in the case of the vibration modes indicated by the characters I and J, the vibration strength and/or the vibration interval vary relative to the switches; therefore, a clear distinction among the switches manipulated is possible with the vibration states.

In the case of the tuning by the second switch 7, like the vibration modes indicated by the characters A, B, C, x x x , the number of vibration (frequency) is set to vary in accordance with the channels. Further, in the case of the turning-on/off of the power supply by the third switch 8, for example, for the turning-on of the power supply, the vibration mode indicated by the character F is set where the strength of vibration assumes weak and then strong values. Conversely, for the turning-off of the power supply, the vibration mode indicated by the character E is set where the strength of vibration assumes strong and then weak values. For the selection to the circulation of air inside the motor vehicle made with the sixth switch 11, the vibration mode indicated by the character G is set, and for the selection to the introduction of air from the external, the vibration mode indicated by the character H is set.

It is also appropriate that a predetermined vibration mode is assigned to a particularly important operation section, where a predetermined vibration mode different therefrom is allocated to each of all the other operation sections, thereby making the particularly important operation section stand out.

Although in this embodiment one vibration means is provided at each of the right- and left-hand outer circumferential sections of the steering wheel, this invention is not limited to this, but it is also possible to provide vibration means are provided individually (for example, under the operation sections) relative to the operation sections (switches), or vibrating the whole steering wheel by one vibration means in each of vibration modes. In the latter case, the vibration means may be fitted to the steering wheel shaft.

In this embodiment, although the switches are used as the operation sections, this invention is not limited to this. It is also possible to mount, in the steering wheel, a slide type operation section in which an operating end is pushed and pulled, a rotating (rotary) type operation section in which an operating end is rotationally driven or rotated, or a joy stick type operation section with an operating lever.

Furthermore, in this embodiment, although a solenoid is used as a vibration means, it is also acceptable to use other devices, for example, a piezoelectric device, a vibrator in which an eccentric weight is provided on a shaft of a small-sized motor, a hydraulic system or the like. In addition, it is also appropriate to use both tactile responses by vibrations and responses based on a sound (for example, a voice, a melody, a chime sound, a buzzer sound, or the like).

Still further, although the description of this embodiment has been made in terms of a steering apparatus for a motor vehicle, this invention is not limited to this, but is also applicable to steering apparatus for others, such as airplanes, ships, various types of working vehicles.

In accordance with a first aspect or form of this invention, as described above a vibration means is provided to provide vibrations to a steering wheel in accordance with operations of operation sections, which returns responses to the palm of the driver, which manipulates the operation sections, in a tactile way. In addition, since the vibration positions do not correspond to the fingertips or the finger intermediate portions unlike the technique proposed hitherto, the operation is recognizable irrespective of the size of the hand and others. Thus, it is possible to accurately recognize the operation of the operation section.

Furthermore, only one vibration means will suffice, thus reducing the number of parts, simplifying the structure, reducing the size and simplifying the assembling work as compared with the conventional technique.

In accordance with a second form of this invention, since vibrations are given to a steering wheel in a different mode corresponding to the contents of the operation of an operation section, more accurate recognition of the operational contents is possible.

In accordance with third and fourth forms of this invention, the steering wheel is for a motor vehicle and other equipment are vehicle mounted equipment, which allows various types of equipment such as a car audio system, a car airconditioner, a navigation system, a power window system and others to be operated while operating the steering wheel. This is convenient.

In accordance with a fifth form of this invention, since the vibration means is built in the steering wheel, the vibration means does not protrude from the steering wheel, and thus the installation of the vibration means does not interfere with the steering wheel operation.

In accordance with sixth and seventh forms of this invention, since the vibration from the vibration means are transmitted through an elastic member to a surface of the steering wheel, the driver's hands can sense soft and comfortable vibrations.

In accordance with eighth and ninth forms of this invention, since a vibration transmission cover is placed on a surface of the steering wheel, the vibrations can be transmitted through a relatively large area to the driver.

In accordance with tenth and eleventh forms of this invention, since the equipment to be operated are selectable through a selection means, the range of the equipment to be operated is extendible.

In accordance with twelfth, thirteenth and fourteenth forms of this invention, since a plurality of operation sections are mounted on the steering wheel and vibrations different in mode depending upon the operations of the operation sections are given to the steering wheel, the contents operable in one piece of equipment can be increased.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A steering apparatus comprising:

a steering wheel for controlling movements of a vehicle;

at least one operating section mounted on said steering wheel adapted to operate equipment mounted on the vehicle, each of the at least one operating section having a plurality of switches corresponding to different functions; and a vibration mechanism to vibrate at least a portion of said steering wheel in relation to operation of said operating section, wherein the vibration mechanism transmits vibrations directly to at least one hand that is in contact with the steering wheel and generates different vibration modes dependent on a particular depressed switch of the plurality of switches in the at least one operating section, the vibration mode generated by each switch having a unique combination of a predetermined vibration strength and a vibration interval.

2. A steering apparatus as defined in claim 1, wherein said vibration mechanism is built in said steering wheel.

3. A steering apparatus as defined in claim 1, wherein the vibrations generated from said vibration mechanism are transmitted through an elastic member to a surface of said steering wheel.

4. A steering apparatus as defined in claim 1, wherein a vibration transmission cover is provided on a surface of said steering wheel.

5. A steering apparatus as defined in claim 1, wherein said operation section operates a plurality of equipment that includes said equipment, and a selection mechanism selects equipment to be operated from said plurality of equipment.

6. A steering apparatus as defined in claim 1, wherein a plurality of operating sections including said operating section are mounted on said steering wheel, and the vibration mode of vibrations supplied to the steering wheel is dependent on the operating section selected.

7. A steering apparatus as defined in claim 1, the vibration mechanism comprising a solenoid, a coil spring and a vibrator.

8. A steering apparatus as defined in claim 4, wherein the vibration transmission cover is arranged proximate to one of a right and left central part of an outer circumference of the steering wheel when the steering wheel is in a neutral position.

9. A steering apparatus as defined in claim 8, wherein vibrations caused by the vibration mechanism are transmitted to the vibration transmission cover through an elastic body.

10. A steering apparatus as defined in claim 1, wherein the vibration modes have one of a gradual increasing vibration strength and a gradual decreasing vibration strength.

11. A steering apparatus as defined in claim 10, wherein vibration modes that have a gradual increasing vibration strength correspond with switches having related increasing functions.

12. A steering apparatus as defined in claim 11, wherein the switches having related increasing functions include a switch that increases air flow from an air conditioner, a switch that increases a temperature of the air conditioner, and a switch that increases a volume level of sound from an audio component.

13. A steering apparatus as defined in claim 10, wherein vibration modes that have a gradual decreasing vibration strength correspond with switches having related decreasing functions.

14. A steering apparatus as defined in claim 13, wherein the switches having related decreasing functions include a switch that decreases air flow from an air conditioner, a switch that decreases a temperature of the air conditioner, and a switch that decreases a volume level of sound from an audio component.

* * * * *